Patented Feb. 7, 1928.

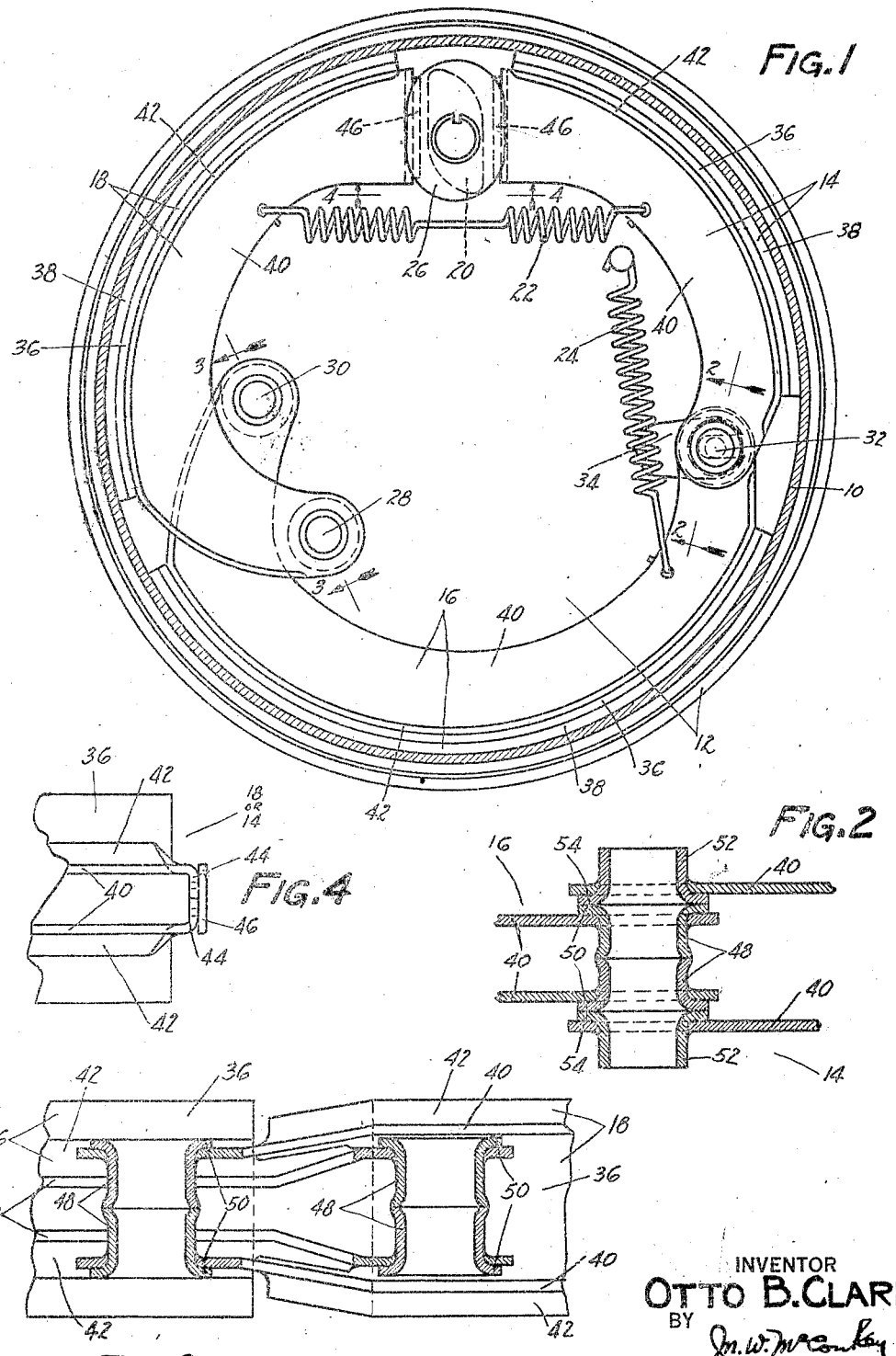

1,658,760

UNITED STATES PATENT OFFICE.

OTTO E. CLARK, OF EVANSVILLE, INDIANA, ASSIGNOR TO BENDIX BRAKE COMPANY, OF CHICAGO, ILLINOIS, A CORPORATION OF ILLINOIS.

BRAKE.

Application filed August 2, 1926. Serial No. 126,363.

This invention relates to brakes, and is illustrated as embodied in an internal expanding automobile brake. An object of the invention is to improve certain structural features of the brake, to facilitate manufacture and assembly of the parts.

I prefer to overlap two of the shoes of the brake at their anchored ends. Partly to permit the use of interchangeable anchors for the two shoes, the two pairs of anchoring arms at the ends of the two shoes, one pair of which straddles the other, have their ends spaced the same distance apart (i. e. the corresponding arms of the two shoes are in the same plane at their ends), this being accomplished by divergence of the straddled arms at their ends. I consider it desirable to provide the ends of each pair of arms with a bushing for the pivot anchor, and by the above-described arrangement the bushings also may be interchangeable if desired, since they are of the same length.

Another feature of the invention relates to offsetting the pair of anchoring arms of each of the shoes, which arms are preferably continuations of the side flanges of a channel shaped shoe body, in such a manner that each pair of arms is anchored entirely within the curve of the other shoe,—i. e. inside the side flanges of the other shoe.

Other features of the invention relate to positioning the unanchored end of one shoe by inner radiating end flanges of pivot bushings carried by straddling parts of an adjacent shoe, which radiating flanges slidably engage similar end flanges of a pivot bushing carried by the straddled shoe end; and to a novel bushing formed by inserting two half-bushings and welding their ends together.

The above and other objects and features of the invention will be apparent from the following description of the illustrative embodiment shown in the accompanying drawing, in which:

Figure 1 is a vertical section through the brake just inside the head of the brake drum and showing the brake shoes in side elevation;

Figure 2 is a partial section through the pivotally-connected ends of two of the shoes, on the line 2—2 of Figure 1, but with the pivot omitted;

Figure 3 is a partial section on the line 3—3 of Figure 1, showing the anchored and overlapping ends of two of the shoes, but with the pivots or anchors omitted; and Figure 4 is an inside plan view of the cam end of one of the shoes, looking in the direction of the arrows 4—4 in Figure 1.

The brake selected for illustration comprises a drum 10, at the open side of which there may be arranged a support such as a backing plate 12, and within which are shown three brake shoes 14, 16, and 18. The brake may be applied by means such as a double cam 20, forcing shoes 14 and 18 apart against the resistance of a return spring 22, shoe 16 being applied by shoe 14 against the resistance of an auxiliary spring 24. Cam 20 may have an end flange 26 laterally confining the free ends of shoes 14 and 18. Shoe 18 is anchored by torque-taking means such as a pivot 28, and shoe 16 by means such as a pivot 30, while shoe 14 is connected to shoe 16 by means such as a pivot 32. Any suitable stop 34 may be provided to determine the idle position of shoe 16.

Each of the shoes preferably is generally channel-shaped, and they may be built up of an outer band or friction part 36 carrying the brake lining 38, together with two spaced-apart stampings each of which is formed to provide a stiffening flange 40 and a cylindrical flange 42 riveted or otherwise secured to band 36. The spacing of flanges 40 apart need not be uniform throughout the length of the shoe, but may vary as desired. For example, flanges 40 of shoe 18 are shown closer together at the cam end of the shoe (Figure 4) than at the anchored end (Figure 3).

At the cam ends of shoes 14 and 18, flanges 40 are turned toward each other, to form coplanar cross flanges 44 (Figure 4) arranged edge to edge. A suitable cam plate 46 is spot-welded or riveted or otherwise secured to these cross flanges, connecting them and bridging across the joint between them.

At the adjacent ends of shoes 14 and 16, the ends of flanges 40 of shoe 16 are somewhat closer together than, and are straddled by, the ends of flanges 40 of shoe 14. To provide suitable bearings for pivot 32, novel bushings are provided.

The bushing for shoe 16 is built up of two half-bushings 48, each with a radiating end flange 50 seated against the outer surface of its shoe flange 40, the two half-bushings being coaxial and engaging each other edge to edge at their inner ends and preferably being butt-welded into one solid unit. To accommodate any flash which may form on the inside of the bushing during welding, and obviate the necessity for machining the inside of the welded bushing by keeping the weld away from pivot 32, the inner ends of the half-bushings are flared slightly outward, thus defining an internal groove at the weld.

Each of the flanges 40 of shoe 14 is provided with a separate bushing 52 having a radiating end flange 52 engaging the inner surface of its shoe-stiffening flange 40, the two end flanges 54 slidably engaging the end flanges 50 of bushing 48, thus confining the end of shoe 16 laterally with respect to shoe 14.

The anchored ends of shoes 16 and 18 are also provided with bushings 48, the same as described above, for pivots or anchors 28 and 30. In the particular arrangement illustrated, flanges 40 of shoe 18 converge somewhat at their ends, and the flanges 40 of shoe 16, after passing between the flanges of shoe 18 to overlap the two shoes, diverge somewhat, so that at the anchored ends of the two shoes the flanges are spaced equally apart,—i. e. the ends of the corresponding flanges are substantially in the same plane. This permits the use of interchangeable pivots 28 and 30, since the two bushings 48 may be of the same length.

While one illustrative embodiment has been described in detail, it is not my intention to limit the scope of the invention to that particular embodiment, or otherwise than by the terms of the appended claims.

I claim:

1. A brake comprising a pair of overlapping shoes, each having a pair of spaced arms at the end adjacent the other shoe, all of the arms being offset from the shoes within the curvature of the shoes, the arms of one shoe being spaced further apart than and straddling the arms of the other shoe, in combination with torque-taking means engaged by the pair of arms of each shoe entirely inside of the curve of the other shoe.

2. A brake comprising a pair of overlapped channel-shaped shoes, each having side flanges continued at one end of the shoe as a pair of spaced arms, all of the arms being offset from the shoes within the curvature of the shoes, the arms of one shoe being spaced further apart than and straddling the arms of the other shoe, in combination with torque-taking means engaged by the pair of arms of each shoe entirely inside of the curve of the side flanges of the other shoe.

3. A brake shoe having spaced stiffening flanges integrally continued crosswise of the shoe toward each other at the end of the shoe to form coplanar cross flanges arranged edge to edge, in combination with a wear plate secured to said cross flanges and bridging the joint between them.

4. A brake shoe comprising spaced portions formed with openings, and a pair of half-bushings in said openings, each half-bushing having a radiating end flange engaging the outer side of its said portion, and the two half-bushings being coaxially arranged with their inner ends edge to edge.

5. A brake shoe comprising spaced portions formed with openings, and a pair of half-bushings in said openings, each half-bushing having a radiating end flange engaging the outer side of its said portion, and the two half-bushings being coaxially arranged with their inner ends edge to edge and welded together.

6. A brake shoe comprising spaced portions formed with openings, and a pair of half-bushings in said openings, each half-bushing having a radiating end flange engaging the outer side of its said portion, and the two half-bushings being coaxially arranged with their inner ends edge to edge, said inner ends flaring slightly outwardly and jointly defining an internal groove, and being butt-welded together.

7. A brake comprising two brake shoes, one shoe having spaced flanges straddling the end of the other shoe, said straddled end having a pivot bushing therethrough which radiating end flanges engaging the opposite sides of the shoe, and each of the spaced flanges of the other shoe having a pivot bushing therethrough with a radiating end flange engaging the inner face of the shoe flange and slidably engaging the end flanges of the straddled shoe bushing and serving to position the end of the straddled shoe laterally.

8. A brake comprising two brake shoes having spaced flanges at their ends, the spaced flanges of one shoe straddling those of the other shoe, said straddled flanges having a pivot bushing therethrough connecting and reinforcing them and formed with radiating end flanges engaging the opposite sides of the shoe, and each of the spaced flanges of the other shoe having a pivot bushing therethrough with a radiating end flange engaging the inner face of the shoe flange and slidably engaging the end flanges of the straddled shoe bushing and serving to position the end of the straddled shoe laterally.

9. A brake comprising two overlapping shoes, each having two anchoring arms projecting beyond the friction part of the shoe and offset within the curve of said friction part, the arms of one shoe passing between the arms of the other and then diverging so that the corresponding arms of the two shoes are in substantially the same plane at their ends, in combination with torque-taking means engaging the ends of each pair of arms.

10. A brake comprising two overlapping shoes, each having two anchoring arms projecting beyond the friction part of the shoe and offset within the curve of said friction part, the arms of one shoe passing between the arms of the other and then diverging so that the corresponding arms of the two shoes are in substantially the same plane at their ends, in combination with a bushing for a pivot for the shoe passing through and carried by the ends of each pair of arms, the two bushings being of substantially the same length.

In testimony whereof, I have hereunto signed my name.

OTTO B. CLARK.